Figure 5:
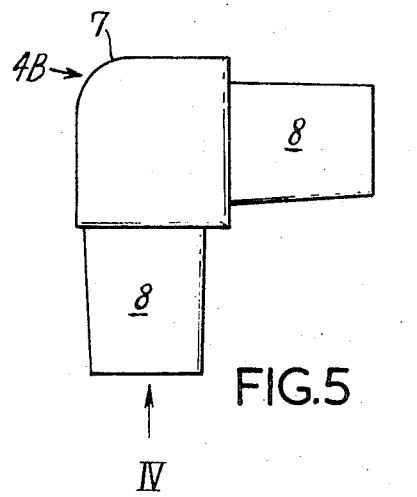

United States Patent [19]
James

[11] 3,728,802
[45] Apr. 24, 1973

[54] CHARTS

[75] Inventor: David Maldon James, Hambrook Hall, near Chichester, England

[73] Assignee: Beanstalk Shelving Limited, Sussex, England

[22] Filed: Dec. 7, 1970

[21] Appl. No.: 95,575

[30] Foreign Application Priority Data

Dec. 8, 1969 Great Britain.....................59,876/69

[52] U.S. Cl. .........................35/73, 211/123, 40/19.5
[51] Int. Cl. ................................................G09f 3/20
[58] Field of Search........................35/24 A, 27, 33, 35/40, 73, 77; 40/19.5, 28 C; 211/34, 35, 36, 37, 123; 272/60, 63

[56] References Cited

UNITED STATES PATENTS

| | | | |
|---|---|---|---|
| 171,884 | 1/1876 | Taylor | 35/73 |
| 268,468 | 12/1882 | Eastman | 35/73 |
| 480,164 | 8/1892 | Barrett | 35/73 X |
| 1,013,856 | 1/1912 | Arnett | 35/73 |
| 1,393,136 | 10/1921 | Johnson | 40/19.5 |
| 2,635,360 | 4/1953 | Bishop | 35/73 |
| 2,664,208 | 12/1953 | Goodman | 211/123 X |
| 2,844,890 | 7/1958 | Oliver | 35/33 X |
| 2,902,776 | 9/1959 | Butler | 35/73 X |
| 3,492,747 | 2/1970 | May | 40/19.5 X |

FOREIGN PATENTS OR APPLICATIONS 501,564 8/1948 Canada .................................211/35

Primary Examiner—Harland S. Skogquist
Attorney—Waters, Roditi, Schwartz & Nissen

[57] ABSTRACT

A wall chart and indicator members therefor, the chart having substantially horizontally extending indicator member supports with which the indicator members can be engaged to hang therefrom.

15 Claims, 12 Drawing Figures

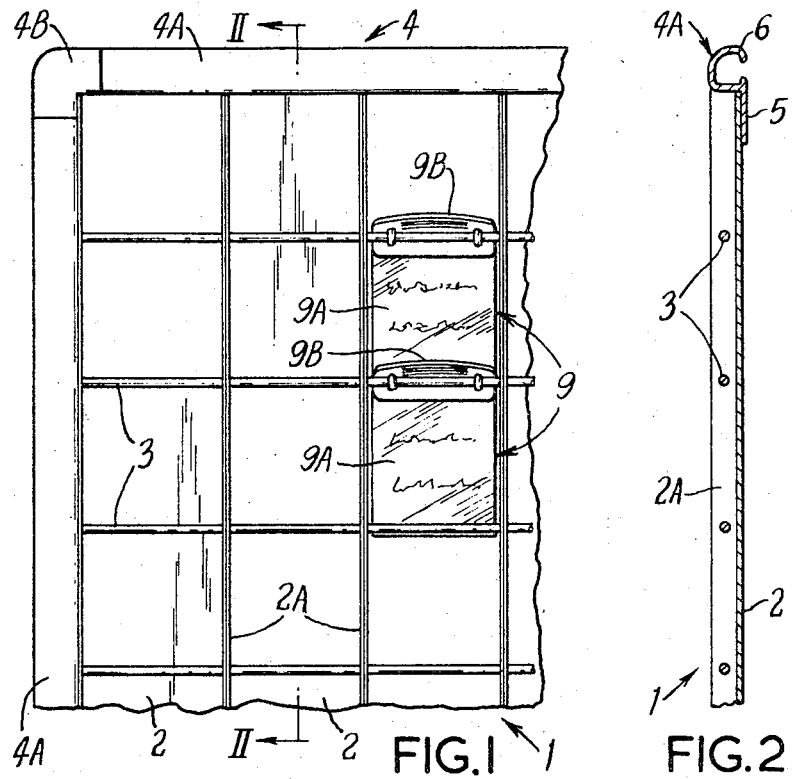
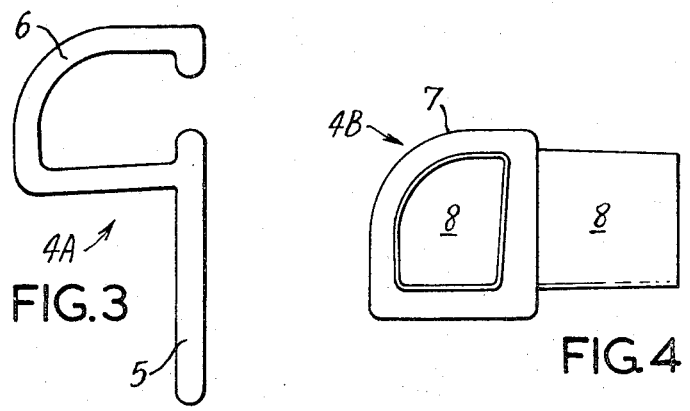

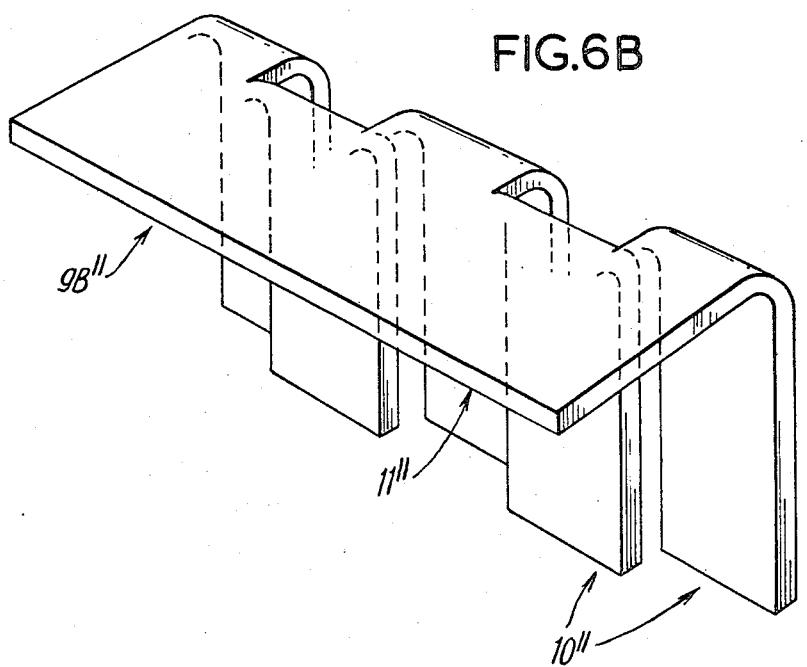

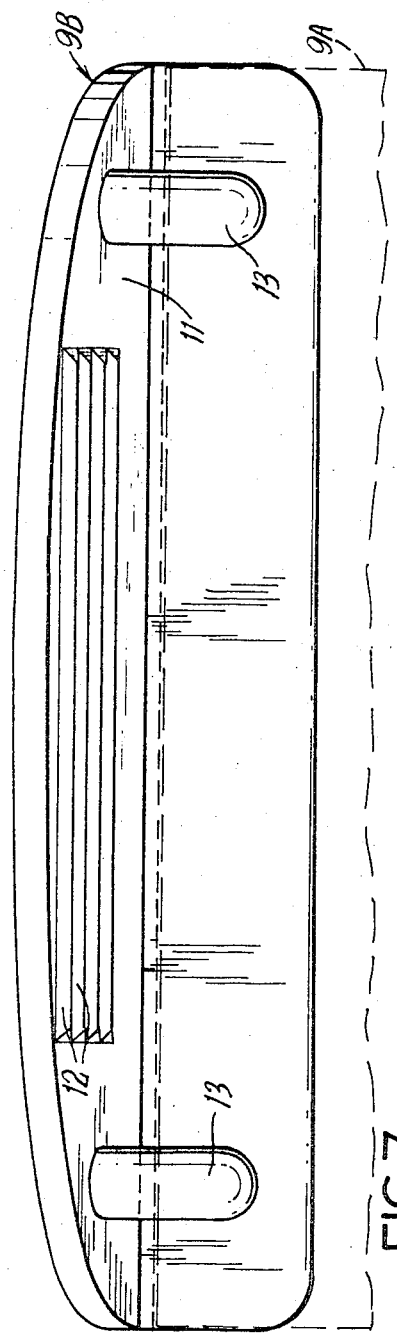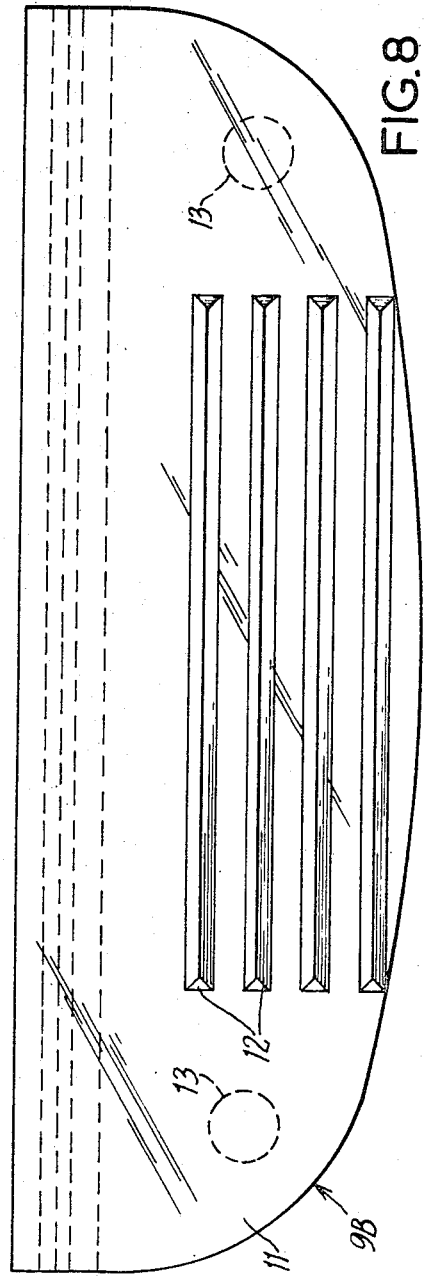

CHARTS

This invention relates to charts of the kind comprising a base member that can be secured to a wall or other upright member, and a set of indicator members, so-called "signals," that can be selectively mounted on the base member so that information carried or constituted by the indicator member id displayed.

According to the present invention, there is provided a chart of the kind comprising a base member that can be secured to a wall or other upright member, and a set of indicator members, so-called "signals," adapted to be selectively mounted on the base member so that information carried or constituted by the indicator members is displayed, said base member being formed of a number of U-sectioned channel members, bars securing said channel members together in side-by-side relationship, said bars extending at right angles to the side members of the channel members, said bars forming indicator member supports when the base member is secured to said wall or other upright member with the bars extending substantially horizontally; and indicator members of said set each having a part adapted to be engaged with said supports, when the base member is so secured, so that the indicator members can be selectively mounted on the base member supported by said supports.

Figure 6A:
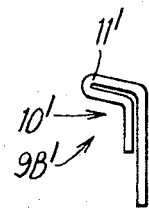
Figure 6:
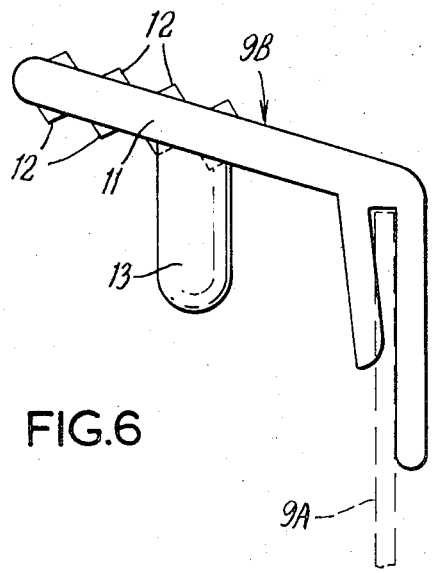
Figure 9:
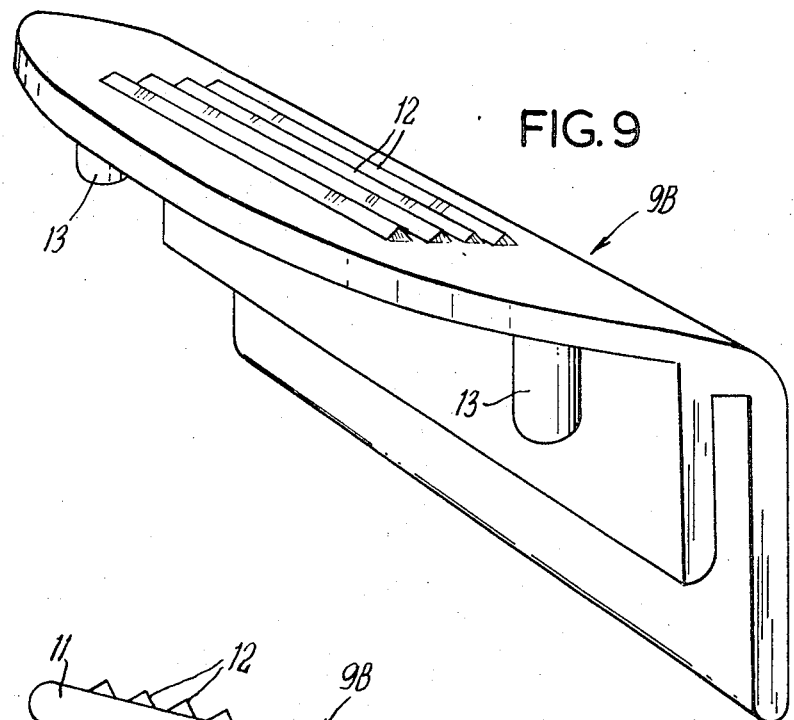
Figure 10:
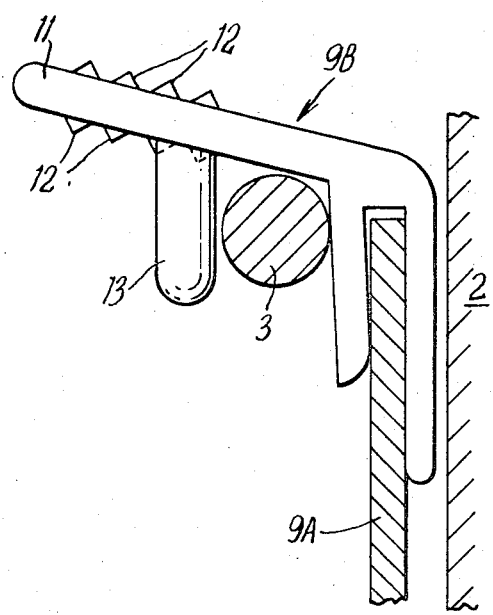

For a better understanding of the invention and to show how the same may be carried into effect, reference will now be made, by way of example to the accompanying drawings, in which:

FIG. 1 is a front view of a grid panel forming the base member of a chart of the kind specified, FIG. 2 is a sectional view taken on the line II—II of FIG. 1, FIG. 3 is an end view, on a larger scale, of a peripheral trim strip of the panel of FIGS. 1 and 2, FIG. 4 is a view taken in the direction of arrow IV of FIG. 5, and also on a larger scale, of a corner moulding associated with the trim strip, FIG. 5 is a front view of the corner moulding, FIG. 6 is a side view on a still larger scale of an indicator card holder, FIG. 6A is a side view (on a smaller scale than FIG. 6) of one alternative form of holder, FIG. 6B is a perspective view of another alternative form of holder, FIG. 7 is a front view of the card holder of FIG. 6, FIG. 8 is a plan view of the card holder of FIGS. 6 and 7, FIG. 9 is a perspective view of the card holder of FIGS. 6, 7 and 8, and FIG. 10 is a side view showing an indicator card holder holding an indicator card and mounted on the grid panel.

The grid panel 1 of FIGS. 1 and 2 includes a number of shallow U-sectioned channel members 2 disposed side-by-side. Bars 3 extending at right-angles to the side members 2A of the channel members 2 pass through aligned holes in these side members 2A and serve to secure the channel members 2 together. This is achieved, during manufacture of the grid panel, by passing bars through the holes in a desired number of channel members disposed side-by-side, the bars being of such a length as to project slightly beyond the outermost side members 2A. A revolving abrasive wheel or disc is then passed along the outer face of each outermost side member 2A to reduce the surplus wire end portions flush with these outer faces. This action also increases the area of the ends of the bars thereby to lock them in the outermost side members 2A. Preferably the channel members are formed of synthetic plastics material and the bars of aluminum. In this case, the heat generated in trimming the bar ends softens the plastics material which fuses with the bar ends being worked. Alternatively, each bar 3 can be rivetted-over at each of its ends thereby to secure the channel members 2 together, or some other method of securing the bars to the channels, for example tightening nuts on screwthreaded ends of the bars, can be employed. Instead of, or as well as, increasing the area of the ends of the bars, other portions of each bar can be increased in area as compared with the remainder of the bar whereby the bar is locked in at least some of the side members of the channel members of the base member Likewise other portions of each bar can be rivetted-over, or screwthreaded and nuts tightened thereupon, whereby the bar is locked in at least some of the side members of the channel members of the base member. Furthermore portions of the bars can be fused or welded to side members of the channel members without increasing the area of the bars proper. As an alternative to the holes in the side members 2A, key-hole slots can be provided extending down from the free edges of the side members and into which the bars can be forced from above. The channel members 2 can, of course, be formed of other material, for example metal or wood, and the bars 3 can, for example, be formed of a metal other than aluminum, or of a synthetic plastics material. The bars 3 can have any desired cross-section. The spacing of the bars 3 is such that the bars 3 and side members 2A define a grid of substantially square mesh.

In the case where the bar ends are finished-off flush with the outermost side member faces, the panel can be placed next to another such panel with no gap between the two panels. As shown in FIGS. 1 and 2, however, the panel 1 has an outer frame 4 that surrounds the perimeter of the panel 1. This frame 4 is made-up of trim strips 4A and corner mouldings 4B. Each trim strip 4A (see FIGS. 2 and 3 has a plate portion 5 that can be secured to the back of the panel 1, for example by adhesive, double adhesive pads, screws or rivets, and a C-sectioned portion 6 integral with the portion 5. When the trim strip 4A is secured to the panel 1, the portion 6 runs along the edge of the panel 1 so as to open to the rear. With the upper trim strip 4A so secured to the panel 1, the panel can be secured to a wall or other upright member with the bars 3 extending horizontally. This is achieved by sliding the trim strip over the heads of two or more screws previously screwed into the wall so as to leave an appropriate gap between the underside of each head and the wall, the screw heads thus being rendered captive in the portion 6 of the trim strip. Alternatively, the trim strip can be slid onto a hinged bar extending horizontally from a wall or other upright member and pivotable about a vertical axis. In this case, if a plurality of such bars are provided, several grid panels can be mounted one behind the other. In either of these methods of mounting, a trim strip along the bottom edge of the panel 1 can be similarly secured to further screws or a further hinged bar.

Where the panel 1 is provided with the complete frame 4, that is where top, bottom and side trim strips 4A are provided, the corner mouldings 4B (see FIGS. 4 and 5) are utilized. Each of these mouldings consists of a corner block 7 having two spigots 8 extending therefrom at right-angles to one another. The spigots 8 are a force fit in the trim strip C-sectioned portion 6 so that they serve to lock the completed frame 4A together.

The trim strips 4A can be formed of metal such as aluminum, or of a synthetic plastics material, and the corner mouldings 4B can be of metal, synthetic plastics material or wood. It will be appreciated that the particular shapes and colors of the strips 4A and moulding 4B can be as desired.

A further method of mounting the panel 1 on a wall or other upright member is to utilize metal plates each carrying one, or a stack of, double adhesive pad(s) on one face. Each plate is secured to the wall, the screw passing through the adhesive pad(s) so as to be buried therein, and the panel is then pressed onto the pads. This method is particularly suitable where the wall is of unplastered brick. On a smooth surfaced wall, double adhesive pads alone may be utilized, one side of each pad being adhered to the wall and the other to the back of the panel 1.

Indicator members 9, so-called "signals," of the set of indicator members of the chart are shown in FIG. 1 in position on the panel 1. Each member 9 consists of a card 9A removably gripped in a holder 9B (FIGS. 6, 7 and 8). The holder 9B has a channel-sectioned base portion 10 into which the card 9A can be inserted, the holder being formed of a resilient metal or plastics material so that one limb of the portion 10 deflects with respect to the other limb and the card is gripped between the two limbs. From the web of the base portion 10 an arm portion 11 extends forwardly and upwardly (with respect to the position of the indicator member 9 on the panel 1). This portion 11 has ribs 12 formed on both its surfaces to assist manual manipulation of the indicator member 9. From the lower surface of the arm portion 11 a pair of spigots 13 project downwardly.

The holders 9B can be of various colors if so desired and the cards 9A may either be plain, so that information to be displayed may be impressed thereupon as desired, or may be preprinted or otherwise inscribed. Alternatively, one or more of the cards may be formed so as to constitute a piece of information to be displayed. The cards can be of any suitable material, for example, a synthetic plastics material.

In use, with the grid panel 1 secured to, for example, a wall with the bars 3 extending horizontally, each indicator member 9 can be mounted on the panel 1 in any desired position as indicated in FIG. 1. To mount a member 9, it is slipped down behind one of the bars 3, between adjacent channel side members 2A, until the forwardly-extending arm portion 11 of the holder 9B comes to rest on the bar 3 with the bar 3 disposed between the spigots 13 and the adjacent limb of the card holder base portion 10 — see FIG. 10. The member 9 thus hangs from the bar which serves as an indicator member support. The length of each spigot 13 is greater than the gap between the bar 3 and the web of the adjacent channel member 2 so that if the indicator member 9 is pivoted clockwise as viewed in FIG. 10, the spigots serve to prevent the member 9 slipping down between the bar and the web. The overall length of each of the members 9 shown in FIG. 1 is such that the bottom edge portion of the card 9A of one member 9 is disposed behind the next bar 3 down, and behind the upper part of the holder 9B of another member 9 where, as shown in FIG. 1, this other member 9 is mounted on this part of the next bar 3 down. If desired, the cards 9A can be of a length such as to fill two or more squares of the grid panel 1 whereby a member 9 mounted immediately below a member 9 of, say, double length will mask the lower half of the double length member.

In alternative forms, not shown, the spigots 13 are replaced by one or more protuberances of other shape than that of the spigots 13, or the arm portion 11 is otherwise suitably increased in section.

The alternative form of card holder 9B' of FIG. 6A is formed from a sheet of resilient material bent to a configuration similar to that of the holder 9B already described. Thus the holder 9B' has a base portion 10' that can releasably grip a card 9A, and an arm portion 11', these portions 10' and 11' corresponding to the portions 10 and 11 of the holder 9B.

The alternative form of card holder 9B" of FIG. 6B is also formed from a single sheet of resilient material bent, cast pressed or otherwise formed into a fork-like configuration and having portions 10" and 11" corresponding to the portions 10, 10' and 11, 11' described above. Adjacent prongs of the portion 10" are staggered with respect to each other so that a card can be gripped between the prongs.

The arm portions 11', 11" of either of the card holders 9B', 9B" can be provided with suitable spigots, protuberances or so increased in section that they cannot slip down between a bar 3 and the adjacent channel member web. It will be appreciated that the card holders 9B', 9B" can be formed of any suitable resilient metal or plastics material.

An alternative form of base member (not shown), to replace the grid panel 1 described above, is formed as a single or sectional moulding having a base from which parallel ribs extend outwardly, these ribs corresponding to the side members 2A of the channel members 2 described above. Indicator member supports in the form of spigots are formed integrally with the ribs, these spigots projecting inwardly with respect to each adjacent pair of ribs and so as to extend substantially horizontally when the base member is mounted on a wall or other upright member. The spigots serve the same function as the bars 3 described above. This alternative form of base member can be made of formed metal with the spigots fashioned from or formed on these ribs and inclined inwardly.

It is to be noted that, although the chart has been described as being used with the bars 3 disposed horizontally, the chart can be secured to a wall or other upright member with the bars 3 extending vertically and it will, in this condition, support indicator members 9 inserted as described above, the members resting, on their sides, on the side members of the channel members and supported by the bars 3.

What we claim is:

1. A chart of the kind comprising a base member that can be secured to a wall or other upright member, and a set of indicator members, so-called "signals," adapted to be selectively mounted on the base member so that information carried or constituted by the indicator members is displayed, said base member being formed of a number of U-sectioned channel members, a plurality of bars securing said channel members together in side-by-side relationship, said bars extending at right angles to the side members of the channel members, said bars forming indicator member supports when the base member is secured to said wall or other upright member with the bars extending substantially horizontally; and indicator members of said set each having a part adapted to be engaged with said support, when the base member is so secured, so that the indicator members can be selectively mounted on the base member supported by said supports.

2. A chart as claimed in claim 1, said bars passing through holes formed in the side members.

3. A chart as claimed in claim 1, said bars being engaged in slots formed in the side members, into which slots the bars are forced from the free edges of the side members.

4. A chart as claimed in claim 1, each said bar having portions of increased area as compared with the remainder of the bar so as to provide for locking of the bar in the side members of at least some of the channel members of the base member.

5. A chart as claimed in claim 1, portions of each said bar being welded to side members of at least some of the channel members of the base member.

6. A chart as claimed in claim 1, portions of each said bar being fused to side members of at least some of the channel members of the base member.

7. A chart as claimed in claim 1, portions of each said bar being rivetted-over so as to lock said bar in side members of at least some of the channel members of the base member.

8. A chart as claimed in claim 1, portions of each said bar being threaded and carrying nuts bearing on faces of the side members of at least some of the channel members of the base member.

9. A chart as claimed in claim 1, comprising a frame surrounding the base member, the frame being adapted for engaging with screw heads projecting from said wall or other upright member, or for engaging with a bar, or an upper and lower bar, projecting from a wall or other upright member, whereby the base member can be secured to the wall or other upright member.

10. A chart as claimed in claim 1, each said indicator member comprising an indicator card holder adapted to releasably receive an indicator card to form the indicator member; the holder comprising a first portion formed for resiliently gripping said indicator card and a second portion inclined with respect to the first portion so as to be engageable with a respective one of said indicator member supports of said chart and to mount on said chart the indicator member formed by the holder and the card.

11. A chart claimed in claim 10, said first portion of the indicator card holder being a channel-sectioned base portion of the holder from a web of which said second portion extends.

12. A chart as claimed in claim 10, said first portion of the indicator card holder being formed by staggered prongs having a common edge, said second portion extending from said edge.

13. A chart as claimed in claim 10, comprising spigots projecting from said second portion of the indicator card holder in the same direction as, but spaced from, said first portion, said spigots being adapted in use, to prevent the holder slipping between the indicator support member by which it is supported and the chart base member.

14. A chart as claimed in claim 10, comprising at least one protuberance projecting from said second portion of the indicator card holder in the same direction as, but spaced from, said first portion, said at least one protuberance being adapted in use, to prevent the holder slipping between the indicator support member by which it is supported and the chart base member.

15. A chart as claimed in claim 10, said second portion of the indicator card holder including ribs to assist in manual manipulation of the holder.

* * * * *